United States Patent
Perrier et al.

(10) Patent No.: US 7,336,869 B2
(45) Date of Patent: Feb. 26, 2008

(54) SYSTEM AND METHOD FOR IMPLEMENTING A HIGH CAPACITY UNREPEATERED OPTICAL COMMUNICATION SYSTEM

(75) Inventors: Philippe A. Perrier, Plano, TX (US); Sergey P. Burtsev, Allen, TX (US); Do Il Chang, Allen, TX (US); Andrzej S. Kaminski, Allen, TX (US); Andrej B. Puc, Allen, TX (US)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 11/279,825

(22) Filed: Apr. 14, 2006

(65) Prior Publication Data

US 2007/0274625 A1  Nov. 29, 2007

(51) Int. Cl.
G02B 6/28 (2006.01)
(52) U.S. Cl. .......................................... 385/24; 385/15
(58) Field of Classification Search ................. 385/15, 385/24
See application file for complete search history.

(56) References Cited

U.S. PATENT DOCUMENTS

| | | | | |
|---|---|---|---|---|
| 6,163,396 A | 12/2000 | Webb | ........................ | 359/332 |
| 6,583,905 B1 | 6/2003 | Bonato et al. | .............. | 359/161 |
| 2003/0053192 A1 | 3/2003 | Islam et al. | ................. | 359/327 |
| 2003/0076577 A1 | 4/2003 | Dominic et al. | ............ | 359/334 |
| 2005/0025501 A1* | 2/2005 | Bickham | .................... | 398/188 |
| 2005/0117839 A1 | 6/2005 | Avallone et al. | .............. | 385/24 |
| 2006/0209394 A1* | 9/2006 | Papernyi et al. | ....... | 359/341.33 |

OTHER PUBLICATIONS

PCT, Notification of Transmittal of the International Search Report and the Written Opinion of the International Searching Authority, or the Declaration, PCT/US07/02841, 8 pages, Oct. 16, 2007.

* cited by examiner

*Primary Examiner*—Jennifer Doan
(74) *Attorney, Agent, or Firm*—Baker Botts L.L.P.

(57) ABSTRACT

A method of communicating an optical signal includes generating an optical signal at a bit rate of at least 2.5 Gb/s. The optical signal including at least thirty optical channels. In one particular embodiment, at least some of the thirty optical channels reside within a 1567-1620 nanometer wavelength range. The method also includes receiving the optical signal at a ROPA that includes a rare-earth doped optical fiber. In addition, the method includes introducing a pump signal to a communication span of the unrepeatered optical communication system. The pump signal operable to amplify the optical signal by Raman amplification within the communication span and including at least one pump signal wavelength operable to excite the rare-earth doped fiber. The method further includes receiving the optical signal after the optical signal has traversed at least 200 kilometers of the communication span.

20 Claims, 2 Drawing Sheets

SYSTEM AND METHOD FOR IMPLEMENTING A HIGH CAPACITY UNREPEATERED OPTICAL COMMUNICATION SYSTEM

TECHNICAL FIELD

This invention relates in general to the field of communication systems and, more particularly, to a system and method for implementing a high capacity unrepeatered communication system.

BACKGROUND

Conventional unrepeatered optical communication systems typically implement a remote optically pumped amplifier ("ROPA") to amplify an optical communication signal as the optical signal traverses an unrepeatered communication span. In most cases, the ROPA is located approximately 50 to 90 kilometers from the receive end of the unrepeatered communication system. The ROPA in a conventional unrepeatered optical communication system typically includes a rare-earth doped fiber that amplifies optical wavelength signals within the C-Band (e.g., wavelengths within the 1530-1565 nanometer range).

SUMMARY OF THE DISCLOSURE

According to one embodiment, an unrepeatered optical communication system comprises a remote optically pumped amplifier (ROPA) that is coupled to a first end of a transmission fiber. The ROPA is operable to receive an optical signal from a first end terminal of the unrepeatered communication system and includes a rare-earth doped optical fiber. The optical signal comprises a plurality of optical signal wavelengths within a 1550-1620 nanometer wavelength range. The system further comprises a pump source that is coupled to a second end of the transmission fiber. The pump source being operable to generate a pump signal that counter-propagates with the optical signal within at least a portion of the transmission fiber. The at least a portion of the transmission fiber comprising a distributed Raman amplifier operable to amplify the optical signal through Raman amplification. The pump signal comprising at least one pump signal wavelength that is operable to excite the rare-earth doped fiber and a power level. In one particular embodiment, the ROPA introduces a loss of no more than four (4) decibels to the optical signal.

According to another embodiment, an unrepeatered optical communication system comprises a first end terminal coupled to a first end of the unrepeatered system. The first end terminal being operable to generate an optical signal at an information bit rate of at least 2.5 Gb/s. The optical signal comprises at least thirty optical channels where at least some of the thirty optical channels reside within a 1550-1620 nanometer wavelength range. The system also comprises a remote optically pumped amplifier (ROPA) coupled to the first end terminal. The ROPA being operable to receive the optical signal generated by the first end terminal and comprising a rare-earth doped optical fiber. The system further comprises a second end terminal coupled to a second end of the unrepeatered system. The second end terminal being operable to receive the optical signal and to introduce to a communication section of the unrepeatered communication system a pump signal. The pump signal being operable to amplify the optical signal and comprising at least one pump signal wavelength that is operable to excite the rare-earth doped fiber. In one particular embodiment, a distance between the first end terminal and second end terminal comprises at least 200 kilometers.

Depending on the specific features implemented, particular embodiments of the present disclosure may exhibit some, none, or all of the following technical advantages. Various embodiments may be capable of increasing the capacity of an unrepeatered optical communication system. Other embodiments may be capable of increasing the reach of an unrepeatered optical communication system. Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Particular examples and dimensions specified throughout this document are for illustrative purposes only, and are not intended to limit the scope of the present disclosure. In particular, this disclosure is not limited to unrepeatered optical communication systems. The teachings of the present disclosure may be used in any optical communication system where it is desired to extend the reach or distance or increase the capacity between optical devices. Moreover, the illustrations in FIGS. 1 through 4 are not intended to be to scale.

Figure 1:
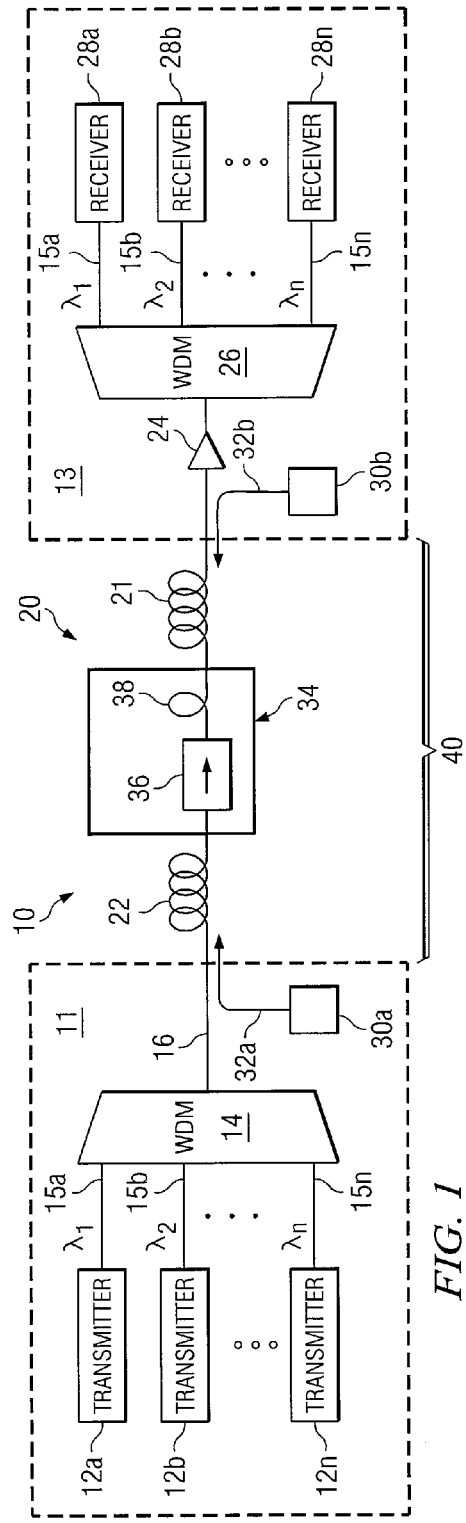
FIG. 1 is a block diagram showing at least a portion of an unrepeatered optical communication system operable to facilitate communication of one or more multiple wavelength signals.

FIG. 1 is a block diagram showing at least a portion of an unrepeatered optical communication system 10 operable to facilitate communication of one or more optical signals 16. In this particular embodiment, optical signal 16 comprises a plurality of optical signal wavelengths. In other embodiments, optical signal 16 may comprise one or more optical signal wavelengths. An "unrepeatered optical communication system" refers to an optical communication system having an optical communication span that includes only passive optical components between end terminals. That is, the communication span of an unrepeatered system is substantially free from components that require electrical power.

In this example, system 10 includes a plurality of transmitters 12a-12n operable to generate a plurality of optical signals (or channels) 15a-15n, each comprising a center wavelength of light. In some embodiments, each optical signal 15a-15n comprises a center wavelength that is substantially different from the center wavelengths of other signals 15. As used throughout this document, the term "center wavelength" refers to a time-averaged mean of the spectral distribution of an optical signal. The spectrum surrounding the center wavelength need not be symmetric about the center wavelength. Moreover, there is no requirement that the center wavelength represent a carrier wavelength. In some embodiments, transmitters 12 can generate, for example, one (1) or more optical channels, thirty (30) or more optical channels, sixty (60) or more optical channels, one-hundred twenty (120) or more optical channels, or any other desired number of optical channels.

Transmitters 12 can comprise any device capable of generating one or more optical signals 15. In some embodiments, optical signals 15 can comprise center wavelengths outside the C-Band of wavelengths (e.g., 1530-1565 nanometer wavelength range). That is, optical signals 15 can comprise center wavelengths within the, for example, L-Band of wavelengths (e.g., 1567-1605 nanometer wavelength range), for example, Extended L-Band of wavelengths (e.g., 1605-1620 nanometer wavelength range), or within the S-Band of wavelengths (e.g., 1500-1530 nanometer wavelength range). In various embodiments, the plurality of optical signals 15 can comprise a channel spacing of, for example, one-hundred (100) GHz (e.g., 0.8 nanometers), fifty (50) GHz (e.g., 0.4 nanometers), or any other desired channel spacing.

Transmitters 12 can comprise externally modulated light sources, or can comprise directly modulated light sources. In one embodiment, transmitters 12 comprise a plurality of independent light sources each having an associated modulator, with each source being operable to generate one or more optical signals 15. Alternatively, transmitter 12 could comprise one or more light sources shared by a plurality of modulators. For example, transmitter 12 could comprise a continuum source transmitter including a mode-locked source operable to generate a series of optical pulses and a continuum generator operable to receive a train of pulses from the mode-locked source and to spectrally broaden the pulses to form an approximate spectral continuum of optical signals. In that embodiment, a signal splitter receives the continuum and separates the continuum into individual signals each having a center wavelength. In some embodiments, transmitter 12 can also include a pulse rate multiplexer, such as a time division multiplexer, operable to multiplex pulses received from the mode locked source or the modulator to increase the bit rate of the system.

Transmitter 12, in some cases, may comprise a portion of an optical regenerator. That is, transmitter 12 may generate optical signals 15 based on electrical representations of electrical or optical signals received from other optical communication links. In other cases, transmitter 12 may generate optical signals 15 based on information received from sources residing locally to transmitters 12. Transmitter 12 could also comprise a portion of a transponder assembly (not explicitly shown), containing a plurality of transmitters and a plurality of receivers. In some embodiments, transmitters 12 can communicate optical signals 15 at a bit rate of, for example, 2.5 Gb/s or more, 10 Gb/s or more, 20 Gb/s or more, 40 Gb/s or more, or any other desired bit rate.

In various embodiments, transmitters 12 may include a forward error correction (FEC) module capable of improving the Q-factor of signals 15 and the transmission performance (e.g., bit-error ratio) of system 10. For example, the FEC module may encode an FEC sequence, such as, Reed Solomon coding, Turbo Product Codes coding, Concatenated Reed-Solomon coding, or other algorithms capable of improving the Q-factor of signals 15 and the bit error ratio of system 10. As used throughout this document, the term "Q-factor" refers to a metric for determining the quality of the signal communicated from a transmitter. The "Q-factor" associated with optical signals 15 communicated from transmitters 12 refers to the difference of the mean value of the high signal values ($M_H$) and the mean value of the low signal values ($M_L$) associated with an optical signal over the statistical sum of the standard deviation of the high signal level ($\Delta_H$) and low signal level ($\Delta_L$). The value of the Q-factor can be expressed in $dB_{20}$. In equation form, this relationship is expressed as:

$$Q=[M_H-M_L] \div [\Delta_H+\Delta_L]$$

In the illustrated embodiment, system 10 also includes a combiner 14 operable to receive optical signals 15a-15n and to combine those signals into a multiple wavelength signal 16. As one particular example, combiner 14 could comprise a wavelength division multiplexer (WDM). The terms wavelength division multiplexer and wavelength division demultiplexer as used herein may include equipment operable to process wavelength division multiplexed signals and/or equipment operable to process dense wavelength division multiplexed signals.

System 10 communicates multiple wavelength signal 16 over an optical communication span 20. Although this example includes one optical communication span 20, any additional number of spans can be used without departing from the scope of the present disclosure. Communication span 20 can comprise, for example, standard single mode fiber (SMF), dispersion shifted fiber (DSF), non-zero dispersion shifted fiber (NZDSF), dispersion compensating fiber (DCF), pure-silica core fiber (PSCF), or another fiber type or combination of fiber types. In various embodiments, span 20 can comprise a span length of, for example, 100 kilometers or more, 150 kilometers or more, 300 kilometers or more, or any other appropriate length. In this particular embodiment, span 20 of system 10 comprises a span length of at least 200 kilometers.

In this particular embodiment, communication span 20 comprises a unidirectional span. Although communication span 20 comprises a unidirectional span in this example, communication span 20 could comprise a bi-directional span without departing from the scope of the present disclosure. Span 20 could comprise a point-to-point communication link, or could comprise a portion of a larger communication network, such as a ring network, a mesh network, a star network, or any other network configuration. For example, communication span 20 could comprise one span or link of a multiple link system, where each link couples to other links through, for example, regenerators.

In this embodiment, a separator 26 separates individual optical signal 15a-15n from multiple wavelength signal 16 received at the end of span 20. Separator 26 may comprise, for example, a wavelength division demultiplexer (WDM). Separator 26 communicates individual signal wavelengths or ranges of wavelengths to a bank of receivers 28 and/or other optical communication paths. One or more of receivers 28 may comprise a portion of an optical transceiver operable to receive and convert signals between optical and electrical formats.

System 10 may further include one or more optical amplifiers coupled to communication span 20. In this example, system 10 includes a remote optically pumped amplifier ("ROPA") 34, two distributed Raman amplifiers (DRA) 21 and 22, and a pre-amplifier 24 operable to amplify signal 16 received from fiber span 20 prior to communicating signal 16 to separator 26. Although system 10 includes ROPA 34, DPA 21 and 22, and pre-amplifier 24, system 10 could include any other amplifier and/or preamplifier 24 could be eliminated without departing from the scope of the present disclosure.

Pre-amplifier 24 could comprise, for example, one or more stages of Raman amplification, rare earth doped amplification stages, such as erbium doped or thulium doped stages, semiconductor amplification stages or a combination of these or other amplification stage types. In some embodiments, pre-amplifier 24 could comprise a bi-directional Raman amplifier. ROPA 34 could comprise, for example, one or more rare earth doped fibers, such as erbium doped or thulium doped fibers. In this particular embodiment, ROPA 34 comprises an optical isolator 36 and an erbium doped fiber 38. In this particular embodiment, DRA 21 comprises a portion of communication span 20. That is, DRA 21 uses at least a portion of the optical fiber of span 20 as a gain medium to amplify optical signal 16 as it traverses span 20. In this particular embodiment, at least the portion of span 20 that includes DRA 21 comprises a dispersion shifted fiber (DSF).

Throughout this document, the term "amplifier" denotes a device or combination of devices operable to at least partially compensate for at least some of the losses incurred by signals while traversing all or a portion of system 10. Likewise, the terms "amplify" and "amplification" refer to offsetting at least a portion of losses that would otherwise be incurred.

An amplifier may, or may not impart a net gain to a signal being amplified. Moreover, the terms "gain" and "amplify" as used throughout this document do not (unless explicitly specified) require a net gain. In other words, it is not necessary that a signal experiencing "gain" or "amplification" in an amplifier stage experience enough gain to overcome all losses in the amplifier stage or in the fiber connected to the amplifier stage. As a specific example, distributed Raman amplifier stages typically do not experience enough gain to offset all of the losses in the transmission fiber that serves as a gain medium. Nevertheless, these devices are considered "amplifiers" because they offset at least a portion of the losses experienced in the transmission fiber.

Depending on the amplifier type chosen, amplifier 24 could comprise a wide band amplifier operable to amplify all optical signals 15a-15n received. Alternatively, amplifier 24 could comprise a parallel combination of narrower band amplifier assemblies, wherein each amplifier in the parallel combination is operable to amplify a portion of the wavelengths of multiple wavelength signal 16. In that case, system 10 could incorporate signal separators and/or signal combiners surrounding the parallel combinations of amplifier assemblies to facilitate amplification of a plurality of groups of wavelengths for separating and/or combining or recombining the wavelengths for communication through system 10.

In this particular embodiment, system 10 includes a first pump source 30a capable of generating a first pump signal 32a for introduction to span 20 and a second pump source 30b capable of generating a second pump signal 32b for introduction to span 20. Although this example includes two pump sources 30 and two pump signals 32, any other number of pump sources and/or pump signals could be used, or one or more of pump sources 30 and/or pump signals 32 could be excluded without departing from the scope of the present disclosure. Pump signals 32a and 32b can each comprise one or more pump wavelengths, each of the one or more pump wavelengths comprising a center wavelength of light. In some embodiments, each of the one or more pump wavelengths within a particular pump signal 32 can comprise a center wavelength that is substantially different from the center wavelengths of the other pump wavelengths within the particular pump signal 32. Pump source 30 can comprise any device or combination of devices capable of generating one or more pump signal wavelengths at desired power levels and wavelengths. For example, pump source 30 can comprise a solid state laser, such a Nd:YAG or Nd:YLF laser, a semiconductor laser such as a Ytterbium doped fiber laser, a laser diode, a cladding pump fiber laser, or any combination of these or other light sources.

In this example, pump signal 32a co-propagates through span 20 in relation to signal 16, while pump signal 32b counter-propagates through span 20 in relation to optical signal 16. As used throughout this document, the term "co-propagates" or "co-propagating" refers to a condition where, for at least some time at least a portion of the pump signal propagates through the gain medium or optical fiber in the same direction as at least one wavelength of the optical signal being amplified. In addition, the term "counter-propagates" or "counter-propagating" refers to a condition where at least a portion of a pump signal propagates through a gain medium or optical fiber in a direction counter to the direction of the optical signal being amplified. Although system 10 introduces pump signal 32a and pump signal 32b to span 20 in this example, one or more of pump signals 32a and 32b could be eliminated in other embodiments.

In the illustrated embodiment, transmitters 12, combiner 14, and a first pump source 30a reside within a first terminal 11, while receivers 28, separator 26, pre-amplifier 24, and a second pump source 30b reside within a second terminal 13. Although in this example terminal 11 includes transmitters 12, combiner 14, and pump source 30a, and terminal 13 includes receivers 28, separator 26, amplifier 24 and pump source 30b, terminals 11 and 13 can each include any combination of transmitters, receivers, combiners, separators, pump sources, and/or amplifiers without departing from the scope of the present disclosure. Additionally, terminals 11 and 13 may include any other optical component. In some cases, terminals 11 and 13 can be referred to as end terminals. The phrase "end terminal" refers to devices operable to perform optical-to-electrical and/or electrical-to-optical signal conversion and/or generation.

In various embodiments, end terminals 11 and 13 can include one or more dispersion compensating elements capable of at least partially compensating for chromatic dispersion associated with signal 16. In some embodiments, the dispersion compensating element can exhibit a dispersion length product that approximately compensates for the dispersion accumulated by optical signal 16 while traversing span 20 of system 10. In other embodiments, at least a portion of a gain medium of amplifier 24 may comprise a dispersion compensating fiber that is capable of at least partially compensating for chromatic dispersion associated with signal 16. In those embodiments, the dispersion compensating fiber can comprise a slope of dispersion that is approximately equal to and opposite from the slope of chromatic dispersion associated with multiple wavelength signal 16.

Conventional unrepeatered optical communication systems typically implement a remote optically pumped amplifier ("ROPA") to amplify an optical communication signal as the optical signal traverses an unrepeatered communication span. In most cases, the ROPA is located approximately 50 to 90 kilometers from the receive end of the unrepeatered communication system and is operable to amplify wavelengths within the 1530-1565 nanometer wavelength range. The optical signal, communicated within these conventional systems, typically includes a multiple wavelength optical signal having its optical channels within the 1530-1565 nanometer wavelength range. In most cases, the optical signal includes eight (8) optical channels within the 1530-1565 nanometer wavelength range. In addition, the optical signals are typically communicated at approximately 2.5 Gb/s over a distance of approximately 270 kilometers.

Unlike conventional unrepeatered systems that include a ROPA, system 10 seeks to increase the capacity of an unrepeatered system that includes a ROPA by communicating one or more optical channels that have a center wavelength outside of the C-Band of wavelengths. That is, system 10 seeks to increase number of optical channels or wavelengths 15 communicated from end terminal 11 by introducing optical channels having their center wavelength outside of the 1530-1565 nanometer wavelength range.

One aspect of this disclosure recognizes that system 10 can be used to upgrade the capacity of a currently deployed unrepeatered optical communication system that implements a ROPA. That is, end terminals 11 and 13 of system 10 can be coupled to the ends of a deployed optical fiber or communication span that includes a ROPA and the resulting system would have an upgraded or increased capacity when compared to the currently deployed system. In some embodiments, system 10 can be implemented over a dark fiber. That is, system 10 can be implemented over a currently installed, but unused optical fiber. In other embodiments, system 10 can be implemented to upgrade an existing or deployed unrepeatered optical communication system.

For example, system 10 could be implemented to upgrade the capacity of a deployed unrepeatered communication system from a system that communicates eight (8) optical channels within the 1530-1565 nanometer wavelength range at 2.5 Gb/s to a system that communicates at least thirty (30) optical channels within the 1567-1593 nanometer wavelength range at approximately 10 Gb/s. In that example, system 10 comprises a communication span length 40 or approximately 270 kilometers and includes a ROPA 34 at approximately 70 kilometers from end terminal 13.

To increase the capacity of an unrepeatered system that includes a ROPA, end terminal 13 introduces pump signal 32b to amplify signal 16 within DRA 21 and to bleach ROPA 34. In this particular embodiment, pump signal 32b counter-propagates through DRA 21 in relation to signal 16. Although pump signal 32b counter-propagates with optical signal 16 in this example, at least a portion of pump signal 32b could co-propagate with optical signal 16 without departing from the scope of the present disclosure As used throughout this document the term "bleach" or "bleaching" refers to minimizing the loss or attenuation that would otherwise be associated with a ROPA deployed within the unrepeatered optical communication system. That is, the pump signal operates to minimize attenuation to the optical signal that would otherwise be associated with an un-pumped ROPA.

The level or amount of bleaching for a particular ROPA is based at least in part on the configuration of the system, the particular structure of the deployed ROPA, the number of optical channels being communicated, the bit rate of the optical channels, and the length or reach of the unrepeatered communication system. In most cases, increasing the number of optical channels within the optical signal, increasing the bit rate of the optical signal, or increasing the communication distance of the optical signal tends to reduce the amount of loss or attenuation of the ROPA that the system can withstand. The attenuation or loss for the ROPA can be, for example, 0 dB, 1 dB or less, 2 dB or less, 3 dB or less, or any other acceptable level of loss for the system. In some cases, the pump signal can operate to provide some gain to the optical signal as the optical signal traverses the ROPA. For example, the optical signal could experience a gain of one (1) dB or more, two (2) dB or more, or four (4) dB or more.

In this particular embodiment, system 10 operates to bleach ROPA 34 by introducing a pump signal having at least one center wavelength capable of exciting rare-earth doped fiber 38 of ROPA 34. In various embodiments, pump signal 32b can include one or more wavelengths within the 1450-1500 nanometer wavelength range. In this particular embodiment, pump signal 32b comprises a first pump wavelength and a second pump wavelength. Although pump signal 32b comprises two pump wavelengths in this example, any other number of pump wavelengths can be used without departing from the scope of the present disclosure. In this example, the first pump wavelength and the second pump wavelength comprise 1465 and 1497 nanometers, respectively. Although the first and second pump wavelengths comprise 1465 and 1497 nanometer wavelengths in this example, any other desired wavelengths may be used without departing from the scope of the present disclosure.

In this particular embodiment, system 10 operates to bleach ROPA 34 by introducing a pump signal having at least one center wavelength capable of exciting rare-earth doped fiber 38 of ROPA 34 and a power level capable of minimizing attenuation of optical signal 16 that would otherwise be attributed to ROPA 34. In various embodiments, pump signal 32b can comprise total pump power level of, for example, 150 milli-watts or more, 200 milli-watts or more, 240 milli-watts or more, one-half (½) watt or more, one (1) watt or more, two (2) watts or more, two and one-half (2.5) watts or more, or any other appropriate power level. In this particular embodiment, pump signal 32b has a total pump power of approximately 280 milli-watts. In this particular embodiment, pump source 30b operates to generate the first pump signal wavelength at approximately 200 milli-watts and the second pump signal at approximately 140 milli-watts. In other embodiments, pump source 30b can operate to generate the first or second pump wavelengths at a power level of, for example, 100 milli-watts, 160 milli-watts, 180 milli-watts, 0.5 watts, one watt, 2.5 watts, or any other appropriate power level.

End terminal 11 operates to introduce optical signal 16 to communication span 20 for communication to end terminal 13. In this embodiment, optical signal 16 includes a plurality of optical channels that reside outside the C-Band (e.g., 1530-1565 nanometer range). One aspect of this disclosure recognizes that by implementing Raman amplification within span 20, the capacity of system 10 can be increased to include wavelengths outside the C-Band. In this particular embodiment, optical signal 16 includes a plurality of channels 15 residing in the 1567-1593 nanometer wavelength range. In other embodiments, optical signal 16 can include a plurality of channels 15 residing in the, for example, L-Band or Extended L-Band, such as, the 1593-1620 nanometer wavelength range, or the 1567-1620 nanometer wavelength range, or any other desired wavelengths or wavelength range outside the C-Band.

In this example, optical signal 16 comprises at least thirty (30) optical channels 15 within the 1567-1593 nanometer wavelength range. In other examples, optical signal 16 can comprise, for example, thirty (30) optical channels or more, sixty (60) optical channels or more, one-hundred twenty (120) optical channels or more, or any other desired number of optical channels. In this particular embodiment, the thirty (30) optical channels of signal 16 comprise a channel spacing of one-hundred GHz (e.g., 0.8 nanometers). In other embodiments, the optical channels of signal 16 can comprise a channel spacing of, for example, fifty (50) GHz (e.g., 0.4 nanometers), or any other desired channel spacing. In this embodiment, optical signal 16 traverses communication span 20 at a bit rate of approximately 10 Gb/s. In other embodiments, optical signal 16 can traverse communication span 20 at a bit rate of, for example, 2.5 Gb/s or more, 20 Gb/s or more, 40 Gb/s or more, or any other desired bit rate. In this example, DRA 21 operates to amplify each of the optical channels 15 of optical signal 16 as signal 16 traverses communication span 20.

One aspect of this disclosure recognizes that the capacity of the unrepeated optical communication system can be increased by introducing a pump signal to bleach the ROPA of the unrepeated communication system and communicating a plurality of optical channels in the low-loss region of the optical fiber of communication span 20 and/or distributed Raman amplifier 21. In most cases, the low-loss region of the optical fiber of communication span 20 will include optical signal wavelengths within the L-Band or Extended L-Band (e.g., 1567-1620 nanometer range).

In some embodiments, system 10 can introduce signal 16 to communication span 20 at or near a minimum threshold power level and amplify signal 16 to the maximum threshold power level while communicating signal 16 through span 20. A "maximum threshold power level" is the optical signal power level, at which the system performance, as measured at the receive end of the communication span, no longer improves, by further increasing the optical signal power level.

The maximum threshold power level of a system is based at least in part on the configuration of the system and the type of fiber implemented in the transmission medium or communication span. In most cases, one or more non-linear interactions within the communication span typically limit and/or determine the maximum threshold power level for the system. In other words, the maximum threshold power level limits the maximum power level associated with the optical signal wavelengths as they are communicated through the transmission medium of the system. By limiting the maximum power of the multiple wavelength optical signals, the non-linear interactions can also limit the communication span length or transmission distance for a particular system. That is, the non-linear interactions can limit the maximum unrepeated transmission distance of the optical signals. These non-linear effects can comprise, for example, four wave mixing, cross-phase modulation, self-phase modulation, stimulated Brillouin scattering, or a combination of these or other non-linear effects.

The minimum threshold power level of a system is based at least in part on the configuration of system 10 and the type of fiber implemented in span 20. In most cases, Multi-Path Interference ("MPI") typically limits and/or determines the minimum threshold power level for the system. In other words, the minimum threshold power level limits the maximum amount of gain that can be introduced to the optical signal wavelengths as they are communicated through the transmission medium of the system. As used throughout this document, the phrase "minimum threshold power level" refers to a power level of an optical signal to which a maximum amount of gain can be introduced to such signal to bring the power level of such signal to the maximum threshold power level. A "maximum amount of gain" is the amount of gain at which any appreciable increase in gain to the signal will introduce performance penalty larger than the benefit from the gain increase, mainly due to MPI.

In this particular embodiment, terminal 11 comprises a boosterless end terminal that uses at least a portion of the optical fiber of span 20 as a distributed Raman amplifier that amplifies signal 16 from the minimum threshold power level to the maximum threshold power level while signal 16 traverses span 20. The term "boosterless end terminal" refers to an end terminal that introduces one or more optical signal wavelengths to a transmission fiber at approximately a minimum threshold power level. Moreover, a boosterless end terminal is one that is substantially free from an amplifier that amplifies a multiple wavelength optical signal to approximately the maximum threshold power level of the communication system before introducing such optical signal into the communication span or transmission fiber.

In this example, boosterless end terminal 11 introduces signal 16 to span 20 at approximately the minimum threshold power level. The minimum threshold power level of signal 16 can comprise, for example, approximately minus twelve (−12) dBm or more, minus ten (−10) dBm or more, minus six (−6) dBm or more, or any other appropriate value. In most cases, the minimum threshold power level of signal 16 can comprise, for example, approximately zero dBm or less, minus two (−2) dBm or less, minus four (−4) dBm or less, or any other appropriate value. Boosterless end terminal 11 also operates to introduce pump signal 32a to span 20 to amplify signal 16 to the maximum threshold power level of system 10. In this particular example, pump signal 32a co-propagates through span 20 in relation to signal 16. In most cases, pump signal 32a can comprise a power level of, for example, one-half (½) watt or more, one (1) watt or more, two (2) watts or more, two and one-half (2½) watts or more.

In this example, introducing signal 16 to span 20 at approximately the minimum threshold power level and amplifying signal 16 using pump signal 32a to the maximum threshold power level within span 20 operates to increase the distance over which pump signal 32a effectively interacts (e.g., transfer energy or amplify) with signal 16 within communication span 20. Increasing the distance over which pump signal 32a effectively interacts with signal 16 within communication span 20 can advantageously extend or delay the point at which signal 16 reaches the maximum threshold power level within span 20. For example, the point at which signal 16 reaches the maximum threshold power level can be approximately thirty (30) km or more from terminal 11, forty (40) km or more from terminal 11, or fifty (50) km or more from terminal 11. In some cases, this can extend the reach of system 10 by, for example, approximately thirty (30) km or more, forty (40) km or more, or fifty (50) km or more. Extending or delaying the point at which signal 16 reaches the maximum threshold power level within span 20 can allow system 10 to increase its capacity distance product, while maintaining a satisfactory system performance.

In most cases, amplifying signal 16 from approximately the minimum threshold power level to approximately the maximum threshold power level within span 20 tends to increase the length of time that signal 16 and pump signal 32a interact within span 20. That is, the one or more pump wavelengths of pump signal 32a operate to introduce a gain to the optical signal wavelengths of signal 16 over an increased length of span 20. Introducing a gain to signal 16 over an increased length of span 20 can advantageously maintain optical signal wavelengths of signal 16 at a power level that is higher than a comparable optical signal that amplifies its signals to approximately the maximum threshold power level before introducing those signals to the communication span.

Introducing signal 16 to span 20 at approximately the minimum threshold power level can also operate to maintain a power level of the optical signal wavelengths 15 of signal 16 at a relatively higher power level than a comparable optical signal that amplifies its signals to approximately the maximum threshold power level before introducing those signals to the communication span. In most cases, increasing the length of span 20 over which pump signal 32a effectively interacts with signal 16 operates to maintain the power level of pumps signal 32a at a relatively higher-level. Maintaining the power level of pump signal 32a at a relatively higher power level can maintain a power level of the optical signal wavelengths 15 of signal 16 at a relatively higher power level over at least a portion of communication span 20.

Another aspect of this disclosure recognizes that system costs can be reduced by implementing a boosterless terminal, and that system performance can be maintained or even improved by implementing one or more pump signals 32 that amplify multiple wavelength optical signal 16 to the maximum threshold power level as signal 16 traverses communication span 20.

In various embodiments, one or more of pump signals 32a and/or 32b can include one or more fractional Raman order pump wavelengths and one or more integer Raman order pump wavelengths. A "fractional order Raman pump wavelength" is a pump wavelength having a Raman gain peak that is not an integer multiple of one-stokes shift (e.g., approximately 13.2 THz) from any optical signal wavelength being communicated through the system. In other words, a fractional Raman order pump wavelength can comprise any pump wavelength having a Raman gain peak that is a non-integer multiple of one-stokes shift from all of optical signals 15a-15n.

In some embodiments, pump signal 32b and/or 32b can include a plurality of first Raman order pump wavelengths and a plurality of fractional Raman order pump wavelengths that are used to amplify at least the first Raman order pump wavelengths. Although pump signal 32b can include a plurality of first and fractional Raman order pump wavelengths, any other combination of integer and/or fractional Raman order pump wavelengths can be used without departing from the scope of the present disclosure. In other embodiments, pump signal 32a can include one or more integer Raman order pump wavelengths and one or more fractional Raman order pump wavelengths. In other embodiments, both pump signal 32a and 32b can include one or more integer Raman order pump wavelengths and one or more fractional Raman order pump wavelengths.

One aspect of this disclosure recognizes that the point at which system 10 experiences gain within span 20 or DRA 21 can be increased by implementing one or more pump fractional Raman pump wavelengths within pump signal 32a and/or pump signal 32b. That is, the point at which multiple wavelength signal 16 experiences gain from pump signals 32a and/or 32b (e.g., the distance from end terminals 11 and 13) can be increased by using one or more fractional Raman order pump wavelengths within pump signals 32a and/or 32b. Conventional design approaches may not have recognized this technique as advantageous, because introducing a fractional Raman order pump wavelength to amplify an integer Raman order pump wavelength tends to reduce the efficiency of the energy transfer between the pump wavelengths. However, introducing a relatively lower gain to the integer Raman order pump wavelengths over an increased length of span 20 can advantageously extend or delay the point at which system 10 experiences gain within span 20 or DRA 21.

In most cases, implementing one or more fractional Raman order pump wavelengths within pump signal 32a and/or pump signal 32b tends to reduce the rate at which the first Raman order pump wavelengths deplete the optical power associated with the fractional Raman order pump wavelengths. That is, implementing one or more fractional Raman order pump wavelengths reduces the efficiency of the energy transfer from the fractional Raman order pump wavelengths to the first Raman order pump wavelengths. Because of the reduced efficiency, the fractional Raman order pump wavelengths operate to introduce a relatively lower gain to the first Raman order pump wavelengths over an increased length of span 20 and/or DRA 21. Introducing a relatively lower gain to the first Raman order pump wavelengths over an increased length of span 20 and/or span 21 can advantageously maintain the first Raman order pump wavelengths at a power level that is higher than a comparable pump signal that implements only inter Raman order pump wavelengths over at least a portion of span 20 or DRA 21.

Figure 2:
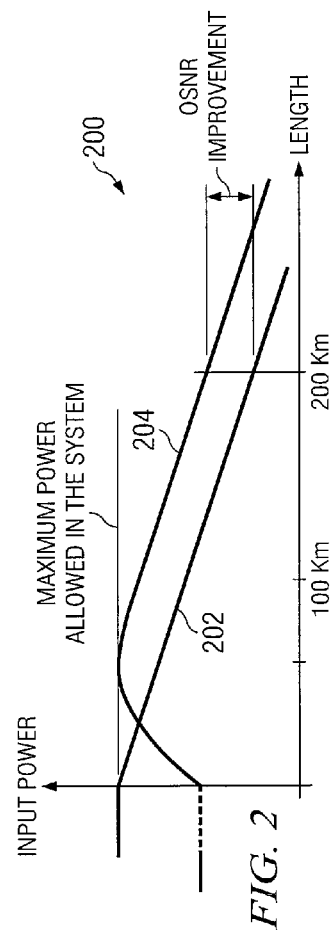
FIG. 2 is a graph comparing a first optical signal communicated from an end terminal that includes a booster amplifier to a second optical signal communicated from a boosterless end terminal.

FIG. 2 is a graph comparing a first optical signal 202 communicated from an end terminal that includes a booster amplifier to a second optical signal 204 communicated from a boosterless end terminal of system 200. In various embodiments, system 200 can be substantially similar in structure and function to unrepeatered system 10 of FIG. 1. The particular parameters, components, and power levels of system 200 and power levels of optical signals 202 and 204 illustrated in FIG. 2 are for illustrative purposes only and are not intended to limit the scope of the present disclosure. It should be appreciated that other combinations of parameters, components, and power levels may be used without departing from the scope of the present disclosure. In the illustrated embodiment, system 200 comprises a maximum threshold power level of approximately thirteen (+13) dBm and a minimum threshold power level of approximately minus seven (−7) dBm. Although the maximum and minimum threshold power levels comprise +13 and −7 dBm, respectively, in this example, any other appropriate maximum and minimum threshold power levels may be used without departing from the scope of the present disclosure.

In this example, system 200 includes a communication span that comprises standard single mode fiber that facilitates the communication of one or more optical signals through system 200. In a first embodiment, the communication span of system 200 receives first optical signal 202 from the end terminal that includes a booster amplifier at approximately a maximum threshold power level for system 200. In that embodiment, the booster amplifier operates to amplify first optical signal 202 to approximately the maximum threshold power level of system 200 (e.g., +13 dBm) before first optical signal 202 is introduced to the communication span of system 200.

Conventional optical communication systems have typically implemented one or more booster amplifiers to amplify a multiple wavelength optical signal to approximately the maximum threshold power level before launching such optical signal into a communication span or transmission fiber. For example, conventional optical communication systems typically include one or more booster amplifiers that are capable of receiving and amplifying the wavelengths of first optical signal 202 to prepare those signals for transmission over a communication span. In most cases, the one or more booster amplifiers operate to amplify first optical signal 202 to at least eighty percent (80%) of a maximum threshold power level for the system.

As discussed above, conventional optical communication systems typically seek to maximize the launch power of the optical signal before introducing such signal to the communication span or transmission medium. In most cases, these conventional systems typically implement one or more booster amplifiers to amplify the optical signals to approximately the maximum threshold power level of the system before introducing such optical signal into a communication span or transmission fiber. By introducing such optical signals into the communication span at approximately the maximum threshold power level, non-linear interactions, such as SBS, can limit the maximum unrepeatered transmission distance of these optical signals in the conventional system. As a result, the optical signals of the conventional systems typically achieve the maximum threshold power level at or near the beginning of the communication span.

In a second embodiment, the communication span of system 200 receives second optical signal 204 from a boosterless end terminal at approximately a minimum threshold power level for system 200 (e.g., −7 dBm). In that embodiment, the boosterless end terminal is substantially free from an amplifier that amplifies second optical signal 204 to approximately the maximum threshold power level of system 200 before introducing second optical signal 204 into the communication span.

In the second embodiment, system 200 also includes a pump source that is capable of generating one or more pump signals for introduction to the communication span of system 200. In some cases, the structure and function of the pump source and pump signal can be substantially similar to pump source 30a and pump signal 32a of FIG. 1, respectively. In that embodiment, the pump source operates to introduce a pump signal that co-propagates with optical signal 204 as optical signal 204 traverses a portion of the communication span of system 200. Although the pump signal co-propagates with optical signal 204 in this example, at least a portion of the pump signal could counter-propagate with optical signal 204 without departing from the scope of the present disclosure. In this particular embodiment, the pump signal amplifies second optical signal 204 to the maximum threshold power level of system 200 as second optical signal 204 traverses the communication span. In various embodiments, the pump source may be capable of generating a pump signal having a total power of, for example, 0.5 watts, one watt, 2.5 watts, or any other appropriate power level.

In this example, line 202 represents the power level of the first optical signal as the first optical signal is communicated through the communication span of system 200, while line 204 represents the power level of the second optical signal as the second optical signal is communicated through the communication span of system 200. In this example, the horizontal axis represents the distance that optical signals 202 and 204 have traversed through the communication span of system 200, while the vertical axis represents a power level of the optical signal.

This graph illustrates that amplifying second optical signal 204 from a minimum threshold power level to a maximum threshold power level as optical signal 204 traverses the communication span can advantageously maintain second optical signal 204 at a power level that is higher than a power level associated with first optical signal 202 over at least a portion of the communication span. In particular, after each of optical signals 202 and 204 traverses approximately thirty kilometers of the communication span, the power level of second optical signal 204 becomes higher than the power level of first optical signal 202. Moreover, after each of optical signals 202 and 204 traverses approximately thirty kilometers of the communication span, the power level of second optical signal 204 is maintained at a higher power level than the power level of first optical signal 202. Because second optical signal 204 is at a higher power level than first optical signal 202 the reach of system 200 and/or the distance second optical signal 204 can be communicated through the communication span can advantageously be increased.

This graph further illustrates that amplifying second optical signal 204 from a minimum threshold power level to a maximum threshold power level as optical signal 204 traverses the communication span advantageously extends or delays the point at which the second optical signal 204 reaches its maximum power level within the communication span when compared to the first optical signal 202. In particular, the maximum signal power level of first optical signal 202 occurs when optical signal 202 is introduced to the communication span, while the maximum signal power level of the second optical signal 204 occurs after second optical signal 204 traverses approximately forty-five kilometers of the communication span. Extending or delaying the point at which signal 204 reaches the maximum threshold power level within the communication span can allow system 200 to increase its capacity, while maintaining a satisfactory system performance.

Figure 3A:
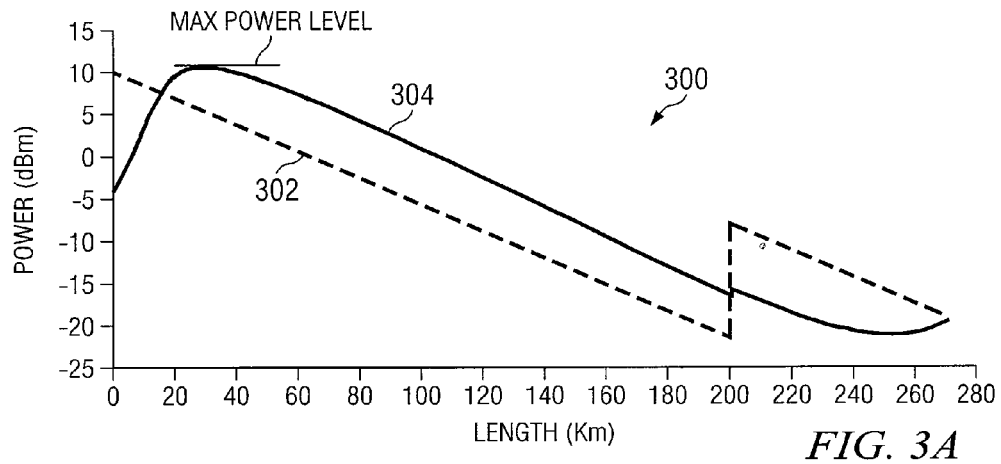
FIGS. 3A-3B are graphs illustrating the power profiles of optical signals as they traverse the communication span of the unrepeatered optical communication system.

FIG. 3A is a graph comparing a first optical signal 302 communicated from a first end terminal to a second optical signal 304 communicated from a second end terminal of system 300. In various embodiments, system 300 can be substantially similar in structure and function to unrepeatered system 10 of FIG. 1. The particular parameters, components, and power levels of system 300 and power levels of optical signals 302 and 304 illustrated in FIG. 3A are for illustrative purposes only and are not intended to limit the scope of the present disclosure. It should be appreciated that other combinations of parameters, components, and power levels may be used without departing from the scope of the present disclosure.

In this example, system 300 includes a communication span that comprises standard single mode fiber that facilitates the communication of one or more optical signals through system 300 and a ROPA that is capable of amplifying an optical signal as that signal traverses system 300. In this example, the communication span comprises a zero dispersion wavelength at approximately 1561 nanometers. In the illustrated embodiment, system 300 comprises a maximum threshold power level of approximately eleven (+11) dBm. Although the maximum threshold power level comprises +11 dBm in this example, any other appropriate maximum threshold power levels may be used without departing from the scope of the present disclosure.

In a first embodiment, the communication span of system 300 receives first optical signal 302 from the end terminal at approximately a maximum threshold power level for system 300. In that embodiment, a booster amplifier operates to amplify first optical signal 302 to approximately the maximum threshold power level of system 300 (e.g., +11 dBm) before first optical signal 302 is introduced to the communication span of system 300.

In the first embodiment, system 300 also includes a ROPA and a pump source that generates a pump signal for amplifying optical signal 302 within the ROPA after signal 302 has traversed approximately 200 kilometers of system 300. In that embodiment, the pump signal counter-propagates with optical signal 302 as optical signal 302 traverses a portion of the communication span of system 300. In the first embodiment, the pump signal comprises a pump wavelength at approximately 1480 nanometers, and optical signal 302 traverses the communication span at approximately 2.5 Gb/s and comprises eight (8) optical channels within the 1530-1565 nanometer wavelength range.

In a second embodiment, the communication span of system 300 receives second optical signal 304 from a second end terminal at approximately minus four (−4) dBm. In that embodiment, system 300 operates to amplify optical signal 304 to approximately the maximum threshold power level of system 300 as signal 304 traverses the communication span.

In the second embodiment, system 300 also includes a pump source that is capable of generating one or more pump signals for introduction to the communication span of system 300. In some cases, the structure and function of the pump source and pump signal can be substantially similar to pump source 30b and pump signal 32b of FIG. 1, respectively. In this embodiment, the pump source operates to introduce a pump signal that counter-propagates with optical signal 304 as optical signal 304 traverses a portion of the communication span of system 300. Although the pump signal counter-propagates with optical signal 304 in this example, at least a portion of the pump signal could co-propagate with optical signal 304 without departing from the scope of the present disclosure.

In the second embodiment, the pump signal operates to amplify second optical signal 304, by Raman amplification, as the signal traverses the communication span between the ROPA and the receiving end terminal (e.g., DRA 21 of FIG. 1) and to bleach the ROPA. System 300 operates to bleach the ROPA by introducing a pump signal having at least one center wavelength capable of exciting the rare-earth doped fiber of the ROPA. In this particular embodiment, optical signal 304 experiences a gain of approximately one (1) dB as signal 304 traverses the ROPA. In this particular embodiment, the pump signal comprises a first pump wavelength at approximately 1465 nanometers and a second pump wavelength at approximately 1497 nanometers. Although the pump signal comprises two particular pump wavelengths in this example, any other number of wavelengths or any other particular wavelengths can be used without departing from the scope of the present disclosure.

In the second embodiment, system 300 operates to bleach the ROPA by introducing a pump signal having at least one center wavelength capable of exciting the rare-earth doped fiber of the ROPA and a power level capable of minimizing attenuation of optical signal 304 that would otherwise be attributed to the ROPA. In the second embodiment, the pump signal has a total pump power of approximately 280 milli-watts. Although the pump signal in this example has a total pump power of 280 milli-watts, any other appropriate power level can be used without departing from the scope of the present disclosure. In this particular example, the pump source operates to generate the first pump signal wavelength at approximately 200 milli-watts and the second pump signal at approximately 140 milli-watts. Although the pump source generates pump signal wavelengths at particular power levels in this example, other power levels can be generated without departing from the scope of the present disclosure.

In the second embodiment, optical signal 304 comprises at least thirty (30) optical channels within the 1567-1593 nanometer wavelength range. Although optical signal 304 comprises thirty optical channels within a particular wavelength range in this example, optical signal 304 could comprise any other number of channels within the L-Band or Extended L-Band without departing from the scope of the present disclosure. In other embodiments, optical signal 304 could comprise one or more optical channels within the C-band. In this particular embodiment, the thirty (30) optical channels of signal 304 comprise a channel spacing of one-hundred GHz (e.g., 0.8 nanometers). In other embodiments, the optical channels of signal 304 can comprise a channel spacing of, for example, fifty (50) GHz (e.g., 0.4 nanometers), or any other desired channel spacing. In this embodiment, optical signal 304 traverses the communication span of system 300 at an information bit rate of approximately 10 Gb/s. Although optical signal 304 traverses the communication span at 10 Gb/s in this example, optical signal 304 could traverse the communication span at any other bit rate without departing from the scope of the present disclosure.

In this example, line 302 represents the power level of the first optical signal of one of the optical channels of the first optical signal as the first optical signal is communicated through the communication span of system 300, while line 304 represents the power level of the second optical signal of one of the optical channels of the second optical signal as the second optical signal is communicated through the communication span of system 300. In this example, the horizontal axis represents the distance that optical signals 302 and 304 have traversed through the communication span of system 300, while the vertical axis represents a power level of the optical signal.

Figure 3B:
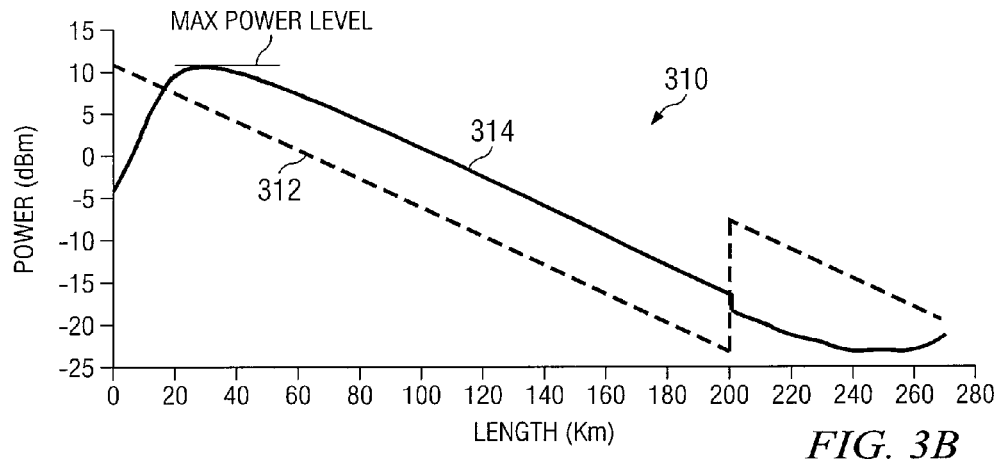

FIG. 3B is a graph comparing a first optical signal 312 communicated from a first end terminal to a second optical signal 314 communicated from a second end terminal of system 310. In various embodiments, system 310 can be substantially similar in structure and function to unrepeatered system 10 of FIG. 1. The particular parameters, components, and power levels of system 310 and power levels of optical signals 312 and 314 illustrated in FIG. 3B are for illustrative purposes only and are not intended to limit the scope of the present disclosure. It should be appreciated that other combinations of parameters, components, and power levels may be used without departing from the scope of the present disclosure.

In this example, system 310 includes a communication span that comprises standard single mode fiber that facilitates the communication of one or more optical signals through system 310 and a ROPA that is capable of amplifying an optical signal as that signal traverses system 310. In this example, the communication span comprises a zero dispersion wavelength at approximately 1561 nanometers. In the illustrated embodiment, system 310 comprises a maximum threshold power level of approximately eleven (+11) dBm. Although the maximum threshold power level comprises +11 dBm in this example, any other appropriate maximum threshold power levels may be used without departing from the scope of the present disclosure.

In a first embodiment, the communication span of system 310 receives first optical signal 312 from the end terminal that at approximately a maximum threshold power level for system 310. In that embodiment, a booster amplifier operates to amplify first optical signal 312 to approximately the maximum threshold power level of system 310 (e.g., +11 dBm) before first optical signal 312 is introduced to the communication span of system 310.

In the first embodiment, system 310 also includes a ROPA and a pump source that generates a pump signal for amplifying optical signal 312 within the ROPA after signal 312 has traversed approximately 200 kilometers of system 310. In that embodiment, the pump signal counter-propagates with optical signal 312 as optical signal 312 traverses a portion of the communication span of system 310. In the first embodiment, the pump signal comprises a pump wavelength at approximately 1480 nanometers, and optical signal 312 traverses the communication span at approximately 2.5 Gb/s and comprises eight (8) optical channels within the 1530-1565 nanometer wavelength range.

In a second embodiment, the communication span of system 310 receives second optical signal 314 from a second end terminal at approximately minus four (−4) dBm. In that embodiment, system 310 operates to amplify optical signal 314 to approximately the maximum threshold power level of system 310 as signal 314 traverses the communication span.

In the second embodiment, system 310 also includes a pump source that is capable of generating one or more pump signals for introduction to the communication span of system 310. In some cases, the structure and function of the pump source and pump signal can be substantially similar to pump source 30b and pump signal 32b of FIG. 1, respectively. In this embodiment, the pump source operates to introduce a pump signal that counter-propagates with optical signal 314 as optical signal 314 traverses a portion of the communication span of system 310. Although the pump signal counter-propagates with optical signal 314 in this example, at least a portion of the pump signal could co-propagate with optical signal 314 without departing from the scope of the present disclosure.

In the second embodiment, the pump signal operates to amplify second optical signal 314, by Raman amplification, as the signal traverses the communication span between the ROPA and the receiving end terminal (e.g., DRA 21 of FIG. 1) and to bleach the ROPA. System 310 operates to bleach the ROPA by introducing a pump signal having at least one center wavelength capable of exciting the rare-earth doped fiber of the ROPA. In this particular embodiment, optical signal 314 experiences a loss of approximately minus two (−2) dB as signal 314 traverses the ROPA. In this particular embodiment, the pump signal comprises a first pump wavelength at approximately 1465 nanometers and a second pump wavelength at approximately 1497 nanometers. Although the pump signal comprises two particular pump wavelengths in this example, any other number of wavelengths or any other particular wavelengths can be used without departing from the scope of the present disclosure.

In the second embodiment, system 310 operates to bleach the ROPA by introducing a pump signal having at least one center wavelength capable of exciting the rare-earth doped fiber of the ROPA and a power level capable of minimizing attenuation of optical signal 314 that would otherwise be attributed to the ROPA. In the second embodiment, the pump signal has a total pump power of approximately 260 milli-watts. Although the pump signal in this example has a total pump power of 260 milli-watts, any other appropriate power level can be used without departing from the scope of the present disclosure. In this particular example, the pump source operates to generate the first pump signal wavelength at approximately 180 milli-watts and the second pump signal at approximately 140 milli-watts. Although the pump source generates pump signal wavelengths at particular power levels in this example, other power levels can be generated without departing from the scope of the present disclosure.

In the second embodiment, optical signal 314 comprises at least thirty (30) optical channels within the 1567-1593 nanometer wavelength range. Although optical signal 314 comprises thirty optical channels within a particular wavelength range in this example, optical signal 314 could comprise any other number of channels within the L-Band or Extended L-Band without departing from the scope of the present disclosure. In this particular embodiment, the thirty (30) optical channels of signal 314 comprise a channel spacing of one-hundred GHz (e.g., 0.8 nanometers). In other embodiments, the optical channels of signal 314 can comprise a channel spacing of, for example, fifty (50) GHz (e.g., 0.4 nanometers), or any other desired channel spacing. In this embodiment, optical signal 314 traverses the communication span of system 310 at an information bit rate of approximately 10 Gb/s. Although optical signal 314 traverses the communication span at 10 Gb/s in this example, optical signal 314 could traverse the communication span at any other bit rate without departing from the scope of the present disclosure.

In this example, line 312 represents the power level of the first optical signal as the first optical signal is communicated through the communication span of system 310, while line 314 represents the power level of the second optical signal as the second optical signal is communicated through the communication span of system 310. In this example, the horizontal axis represents the distance that optical signals 312 and 314 have traversed through the communication span of system 310, while the vertical axis represents a power level of the optical signal.

These graphs illustrate that the capacity of an unrepeatered optical communication system can be increased by introducing a pump signal to bleach the ROPA of the unrepeated communication system and communicating a plurality of optical channels in the low-loss region of the optical fiber of the communication span and/or the distributed Raman amplifier. In most cases, the low-loss region of the optical fiber of the communication span will include optical signal wavelengths within the L-Band or Extended L-Band (e.g., 1567-1620 nanometer range).

These graphs further illustrate that the capacity of an unrepeatered optical communication system can be increased from eight (8) optical channels within the 1530-1565 nanometer wavelength range to at least thirty (30) optical channels within the 1567-1593 nanometer without significantly affecting the power level of the optical signal at the end of the communication span.

Figure 4:
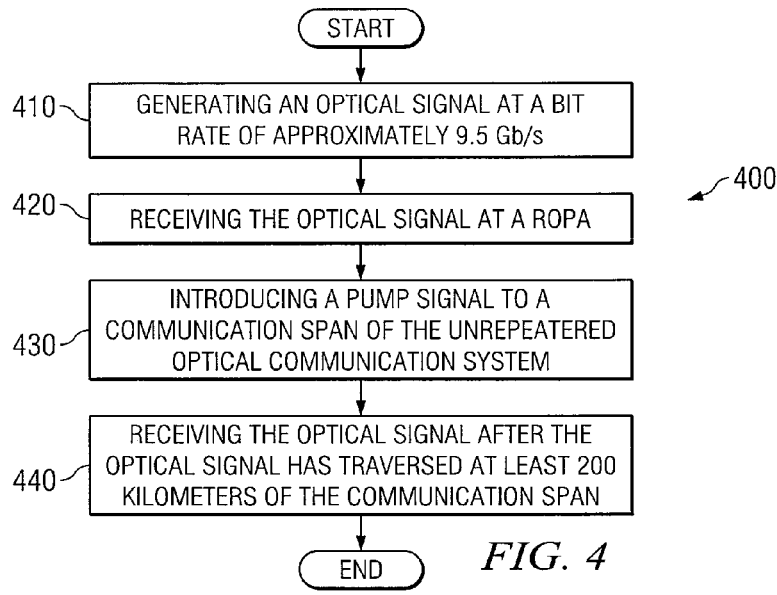
FIG. 4 is a flow chart showing one example of a method of implementing a high capacity unrepeatered optical communication system.

FIG. 4 is a flow chart showing one example of a method 400 of implementing a high capacity unrepeatered optical communication system. In one particular embodiment, the optical signal may be amplified within unrepeatered system 10 of FIG. 1. In various embodiments, system 10 can include one or more transmitters 12a-12n capable of generating a plurality of optical signal channels 15, each comprising a center wavelength of light. In some embodiments, transmitters 12 may include a forward error correction (FEC) module capable improving the Q-factor of signals 15 and the bit-error ratio of system 10. In other embodiments, system 10 can also include a combiner 14 capable of combining each of the plurality of optical signal wavelengths 15 into a multiple wavelength signal 16 for communication across communication span 20.

In this example, method 400 begins at step 410 by generating an optical signal 16 at a bit rate of at least 10

Gb/s. Although optical signal 16 is generated at a bit rate of at least 10 Gb/s, any other bit rate may be used without departing from the scope of the present disclosure. In this example, end terminal 11 operates to introduce optical signal 16 to communication span 20 for communication to end terminal 13. In this embodiment, optical signal 16 includes a plurality of optical channels that reside outside the C-Band (e.g., 1530-1565 nanometer range). In this particular embodiment, optical signal 16 includes a plurality of channels 15 residing in the 1567-1593 nanometer wavelength range. In other embodiments, optical signal 16 can include a plurality of channels 15 residing in the, for example, L-Band wavelength range, Extended L-Band wavelength range, or any other desired wavelengths or wavelength range outside the C-Band.

In this example, optical signal 16 comprises at least thirty (30) optical channels within the 1567-1593 nanometer wavelength range. Although signal 16 comprises thirty optical channels in this example, any other number of optical channels may be used without departing from the scope of the present disclosure. In this particular embodiment, the thirty (30) optical channels of signal 16 comprise a channel spacing of one-hundred GHz (e.g., 0.8 nanometers). In other embodiments, the optical channels of signal 16 can comprise a channel spacing of, for example, fifty (50) GHz (e.g., 0.4 nanometers), or any other desired channel spacing. In this example, DRA 21 operates to amplify each of the optical channels 15 of optical signal 16 as signal 16 traverses communication span 20.

Method 400 continues by receiving the optical at a remote optically pumped amplifier (ROPA) 34 at step 420. ROPA 34 could comprise, for example, one or more rare earth doped fibers, such as erbium doped or thulium doped fibers. In this particular embodiment, ROPA 34 comprises an optical isolator 36 and a rare-earth doped fiber 38.

In this example, pump source 30b generates at least one pump signal 32b and introduces pump signal 32b to communication span 20 at step 420. To increase the capacity of a deployed unrepeatered system that includes a ROPA, end terminal 13 introduces pump signal 32b to amplify signal 16 within DRA 21 and to bleach ROPA 34. The attenuation or loss for the ROPA can be, for example, 0 dB, 1 dB or less, 2 dB or less, 3 dB or less, or any other acceptable level of loss for the system. In some cases, the pump signal can operate to provide some gain to the optical signal as the optical signal traverses the ROPA. For example, optical signal 16 could experience a gain of one (1) dB or more, two (2) dB or more, or four (4) dB or more. In this particular embodiment, pump signal 32b counter-propagates through DRA 21 in relation to signal 16. Although pump signal 32b counter-propagates with optical signal 16 in this example, at least a portion of pump signal 32b could co-propagate with optical signal 16 without departing from the scope of the present disclosure.

In this particular embodiment, system 10 operates to bleach ROPA 34 by introducing a pump signal having at least one center wavelength capable of exciting rare-earth doped fiber 38 of ROPA 34. In this particular embodiment, pump signal 32b comprises a first pump wavelength having a center wavelength at approximately 1465 nanometers and a second pump wavelength having a center wavelength at approximately 1497 nanometers. Although pump signal 32b comprises two pump wavelengths at particular center wavelengths in this example, any other number of pump wavelengths having any desired wavelength can be used without departing from the scope of the present disclosure. In some embodiments, pump signal 32b can include one or more wavelengths within the 1450-1500 nanometer wavelength range.

In this particular embodiment, system 10 operates to bleach ROPA 34 by introducing a pump signal having a pump signal having at least one center wavelength capable of exciting rare-earth doped fiber 38 of ROPA 34 and a power level capable minimizing attenuation of optical signal 16 that would otherwise be attributed to ROPA 34. In this particular embodiment, pump signal 32b has a total pump power of approximately 280 milli-watts. Although pump signal 32b comprises a total pump power of 280 milli-watts in this example, any other desired total pump power may be used without departing from the scope of the present disclosure. In this particular embodiment, the first pump signal wavelength comprises a pump power of approximately 200 milli-watts and the second pump signal comprises a pump power of approximately 140 milli-watts. Although first and second pump signal wavelength comprise particular power levels in this example, any other desired power level may be used without departing from the scope of the present disclosure.

In this example, end terminal 13 receives optical signal 16 after signal 16 has traversed at least two hundred (200) kilometers of communication span 20. Although communication span 20 comprises a span length 40 of at least 200 kilometers in this example, any other span length 40 can be used without departing from the scope of the present disclosure.

Although the present invention has been described in several embodiments, a myriad of changes, variations, alternations, transformations, and modifications may be suggested to one skilled in the art, and it is intended that the present invention encompass such changes, variations, alterations, alterations, transformations, and modifications as falling within the spirit and the scope of the appended claims.

What is claimed is:

1. An unrepeatered optical communication system comprising:
   a first end terminal of an unrepeatered optical communication system coupled to a first end of a first transmission fiber, the first end terminal adapted to generate an optical signal and a first pump signal for receipt by the first transmission fiber, wherein the first pump signal co-propagates with at least a portion of the optical signal within at least a portion of the first transmission fiber, wherein the first pump signal operates to amplify the optical signal in the first transmission fiber through Raman amplification;
   a remote optically pumped amplifier (ROPA) coupled to a second end of the first transmission fiber and to a first end of a second transmission fiber, the ROPA operable to receive the optical signal from the first end terminal of the unrepeatered communication system, the ROPA comprising a rare-earth doped optical fiber, the optical signal comprising a plurality of optical signal wavelengths within a 1567-1620 nanometer wavelength range; and
   a second end terminal coupled to a second end of the second transmission fiber, the second end terminal adapted to receive the optical signal and generate a second pump signal, wherein the second pump signal counter-propagates with the optical signal within at least a portion of the second transmission fiber, the at least a portion of the second transmission fiber comprising a distributed Raman amplifier operable to amplify the optical signal through Raman amplification, the second pump signal comprising at least one pump signal wavelength operable to excite the rare-earth doped fiber and a power level, wherein the ROPA introduces a loss of no more than four (4) decibels to the optical signal.

2. The system of claim 1, wherein the transmission fiber is substantially free from optical components that require electrical power.

3. The system of claim 1, wherein the optical signal comprises at least thirty (30) optical channels.

4. The system of claim 3, wherein the at least thirty optical channels comprise a channel spacing of approximately 100 GHz.

5. The system of claim 1, wherein the optical signal comprises at least sixty (60) optical channels.

6. The system of claim 1, wherein the first transmission fiber and the second transmission fiber comprise a span length of at least 270 kilometers.

7. The system of claim 1, wherein the ROPA is located at least 200 kilometers from the first end terminal.

8. The system of claim 1, wherein the at least one pump signal wavelength comprises a center wavelength within a 1450-1500 nanometer wavelength range.

9. The system of claim 1, wherein the power level of the at least one pump signal wavelength comprises at least 100 milli-watts.

10. The system of claim 1, wherein the second end terminal comprises a pump source, and, wherein the first end terminal is coupled to a first end of the unrepeatered system and the second end terminal is coupled to a second end of the unrepeatered system.

11. The system of claim 10, wherein the first end terminal comprises a boosterless end terminal comprising a first pump source capable of generating the first pump signal for receipt by the first transmission fiber.

12. An unrepeatered optical communication system comprising:
   a first end terminal of an unrepeatered optical communication system coupled to a first end of a first transmission fiber, the first end terminal adapted to generate an optical signal and a first pump signal for receipt by the first transmission fiber, wherein the first pump signal co-propagates with at least a portion of the optical signal within at least a portion of the first transmission fiber, wherein the first pump signal operates to amplify the optical signal in the first transmission fiber through Raman amplification, the first end terminal operable to generate the optical signal at a bit rate of at least 2.5 Gb/s, the optical signal comprising at least thirty optical channels, wherein at least some of the thirty optical channels reside within a 1567-1620 nanometer wavelength range;
   a remote optically pumped amplifier (ROPA) coupled to a second end of the first transmission fiber and to a first end of a second transmission fiber and operable to receive the optical signal generated by the first end terminal, the ROPA comprising a rare-earth doped optical fiber; and
   a second end terminal coupled to a second end of the second transmission fiber, wherein the second end terminal is operable to receive the optical signal, the second end terminal further operable to introduce to the second transmission fiber a second pump signal operable to amplify the optical signal, the second pump signal comprising at least one pump signal wavelength operable to excite the rare-earth doped fiber, wherein a distance between the first end terminal and second end terminal comprises at least 200 kilometers.

13. The system of claim 12, wherein the second pump signal counter-propagates with the optical signal within at least a portion of the second transmission fiber.

14. The system of claim 12, wherein the at least one pump signal wavelength comprises a power level of at least 100 milli-watts.

15. The system of claim 12, wherein the at least one pump signal wavelength comprises a center wavelength within a 1450-1500 nanometer wavelength range.

16. The system of claim 12, wherein the ROPA introduces a loss of no more than two (2) decibels to the optical signal.

17. A method of communicating an optical signal in an unrepeatered optical communication system, the method comprising:
   generating an optical signal at a first end terminal for receipt by a first transmission fiber at a bit rate of at least 2.5 Gb/s, the optical signal comprising at least thirty optical channels, wherein at least some of the thirty optical channels reside within a 1567-1620 nanometer wavelength range;
   generating a first pump signal at the first end terminal for receipt by the first transmission fiber, wherein the first pump signal co-propagates with at least a portion of the optical signal within at least a portion of the first transmission fiber, the at least a portion of the first transmission fiber comprising a distributed Raman amplifier operable to amplify the optical signal through Raman amplification;
   receiving the optical signal from the first transmission fiber at a remote optically pumped amplifier (ROPA), the ROPA comprising a rare-earth doped optical fiber
   communicating the optical signal from the ROPA to a second end terminal through a second transmission fiber;
   introducing a second pump signal to the second transmission fiber of the unrepeatered optical communication system, the second pump signal amplifying the optical signal by Raman amplification within the second transmission fiber, the second pump signal comprising at least one pump signal wavelength operable to excite the rare-earth doped fiber; and
   receiving the optical signal at the second end terminal after the optical signal has traversed at least 200 kilometers.

18. The method of claim 17, wherein the second pump signal counter-propagates with the optical signal within at least a portion of the second transmission fiber.

19. The method of claim 17, wherein the at least one pump signal wavelength comprises a power level of at least 100 milli-watts and a center wavelength within a 1450-1500 nanometer wavelength range.

20. The method of claim 17, wherein the ROPA introduces a loss of no more than two (2) decibels to the optical signal.

* * * * *